(12) United States Patent
Ishida

(10) Patent No.: US 7,802,661 B2
(45) Date of Patent: Sep. 28, 2010

(54) BRAKE DEVICE FOR MOTORCYCLE

(75) Inventor: Shinichiro Ishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 527 days.

(21) Appl. No.: 11/226,143

(22) Filed: Sep. 14, 2005

(65) Prior Publication Data
US 2006/0076197 A1    Apr. 13, 2006

(30) Foreign Application Priority Data
Sep. 30, 2004  (JP)  ............... 2004-289352

(51) Int. Cl.
    *B62L 5/00*   (2006.01)
(52) U.S. Cl. .............. 188/26; 188/24.11; 188/345; 180/219; 180/226
(58) Field of Classification Search ............ 188/345, 188/344, 26, 24.11, 72.8; 303/137; 280/764; 180/219, 227, 226
See application file for complete search history.

(56) References Cited

U.S. PATENT DOCUMENTS

| 4,852,701 A * | 8/1989 | Wakatsuki .............. 188/181 A |
| 5,388,659 A * | 2/1995 | Pepe ........................ 180/219 |
| 6,367,255 B1 * | 4/2002 | Gogo et al. .................. 60/588 |
| 6,450,301 B1 * | 9/2002 | Iizuka et al. ................. 188/26 |
| 6,547,024 B2 * | 4/2003 | Ohyama et al. ............. 180/227 |
| 6,609,585 B2 * | 8/2003 | Buell et al. .................. 180/227 |
| 6,676,149 B2 * | 1/2004 | Kamemizu et al. ....... 280/281.1 |
| 7,163,365 B2 * | 1/2007 | Manaka et al. .............. 411/374 |
| 7,174,981 B2 * | 2/2007 | Sugitani et al. ............ 180/68.1 |
| 7,198,129 B2 * | 4/2007 | Sakaki et al. ............... 180/219 |
| 2002/0007977 A1 * | 1/2002 | Ishii et al. .................... 180/219 |
| 2003/0213666 A1 * | 11/2003 | Masuda et al. .............. 188/344 |

FOREIGN PATENT DOCUMENTS

| JP | 6-144339 A | 5/1994 |
| JP | 2002-079981 A | 3/2002 |
| JP | 2002-087365 A | 3/2002 |
| JP | 2002-154469 | 5/2002 |

OTHER PUBLICATIONS

Japanese Office Action drafted Jan. 15, 2009.

* cited by examiner

*Primary Examiner*—Robert A Siconolfi
*Assistant Examiner*—Mariano Sy
(74) *Attorney, Agent, or Firm*—Hamre, Schumann, Mueller & Larson, P.C.

(57) ABSTRACT

A brake device for a motorcycle which includes a brake caliper for parking and which favorably ensures the followability of the swing arm in response to the fluctuation of a road surface. A brake caliper for braking and a brake caliper for parking are respectively arranged separately in the vertical direction with respect to the swing arm and, at the same time, are arranged in front of the rear axle. Here, the brake caliper for parking is arranged below the swing arm and the brake caliper for braking is arranged above the swing arm.

6 Claims, 3 Drawing Sheets

BRAKE DEVICE FOR MOTORCYCLE

The present invention relates to a parking brake device for a motorcycle which includes a brake caliper for braking speed and a brake caliper for parking.

BACKGROUND OF THE INVENTION

With respect to a brake device of a motorcycle, there has already been proposed a motorcycle on which a brake device for parking is mounted beside a brake device for braking.

In the motorcycle on which the brake device for parking is mounted, for example, a brake caliper for parking is mounted at a position above a rear wheel axle on a swing arm which tiltably supports a rear wheel, and a parking lever which is interlockingly operated with the brake caliper for parking is mounted below a bar handle. Further, the brake caliper for braking the rear wheel is mounted on a lower side of the swing arm at a position behind the axle for example, Japanese Patent Laid-open 2002-154469.

The above-mentioned motorcycle is favorable as a user friendly motorcycle. However, the brake caliper for parking which forms a new constituting member is mounted on the swing arm and hence, the moment of inertia around the rear wheel is slightly increased. Further, the brake caliper for braking the rear wheel is mounted on the swing arm at a position behind the axle and is arranged at a position away from a tilting center axis of the swing arm thus resulting in promoting the increase of the moment of inertia around the rear wheel.

Accordingly, it is an object of the present invention to provide a brake device which can mount a brake caliper for parking while favorably ensuring the followability of a swing arm in response to the fluctuation of a road surface.

SUMMARY OF THE INVENTION

To achieve the above-mentioned technical task, a brake device according to the present invention includes the following technical means.

That is, a brake device according to the present invention includes a brake caliper for braking and a brake caliper for parking, the respective calipers being arranged separately above and below a swing arm and, at same time, the respective calipers are arranged in front of an axle. The brake caliper for parking is preferably a mechanical brake caliper. The brake caliper for parking is arranged preferably below the swing arm. The brake caliper for parking is miniaturized compared to the brake caliper for braking.

By arranging all brake calipers in front of the axle and, by making the distance between the tilting center axis of the swing arm and the respective brake calipers short, the moment of inertia around the rear wheel is decreased and the followability of the swing arm in response to the fluctuation of the road surface can be enhanced. Further, since a brake hose, and a cable and the like can be made short, it is possible to reduce the weight of the vehicle body and, at the same time, it is possible to provide a brake device which is advantageous in terms of cost.

By adopting a mechanical brake caliper as the brake caliper for parking, the number of parts of the brake device can be decreased and hence, a cost can be reduced compared to a case in which a hydraulic brake is adopted as the brake caliper for parking.

By arranging the brake caliper for parking on the lower side of the swing arm, the swing arm functions as a protector against rain and hence, dirt hardly adheres to the brake caliper for parking. Further, the brake caliper for braking which frequently requires maintenance thereof is inevitably arranged on the upper side of the swing arm and hence, it is possible to provide a brake device which exhibits a favorable maintenance property.

By adopting a smaller or miniaturized brake caliper for parking compared to the brake caliper for braking, it is possible to minimize the influence of rain. Further, it is possible to provide a brake device having good appearance without destroying the total balance of the motorcycle.

DETAILED DESCRIPTION OF THE INVENTION

Figure 1:
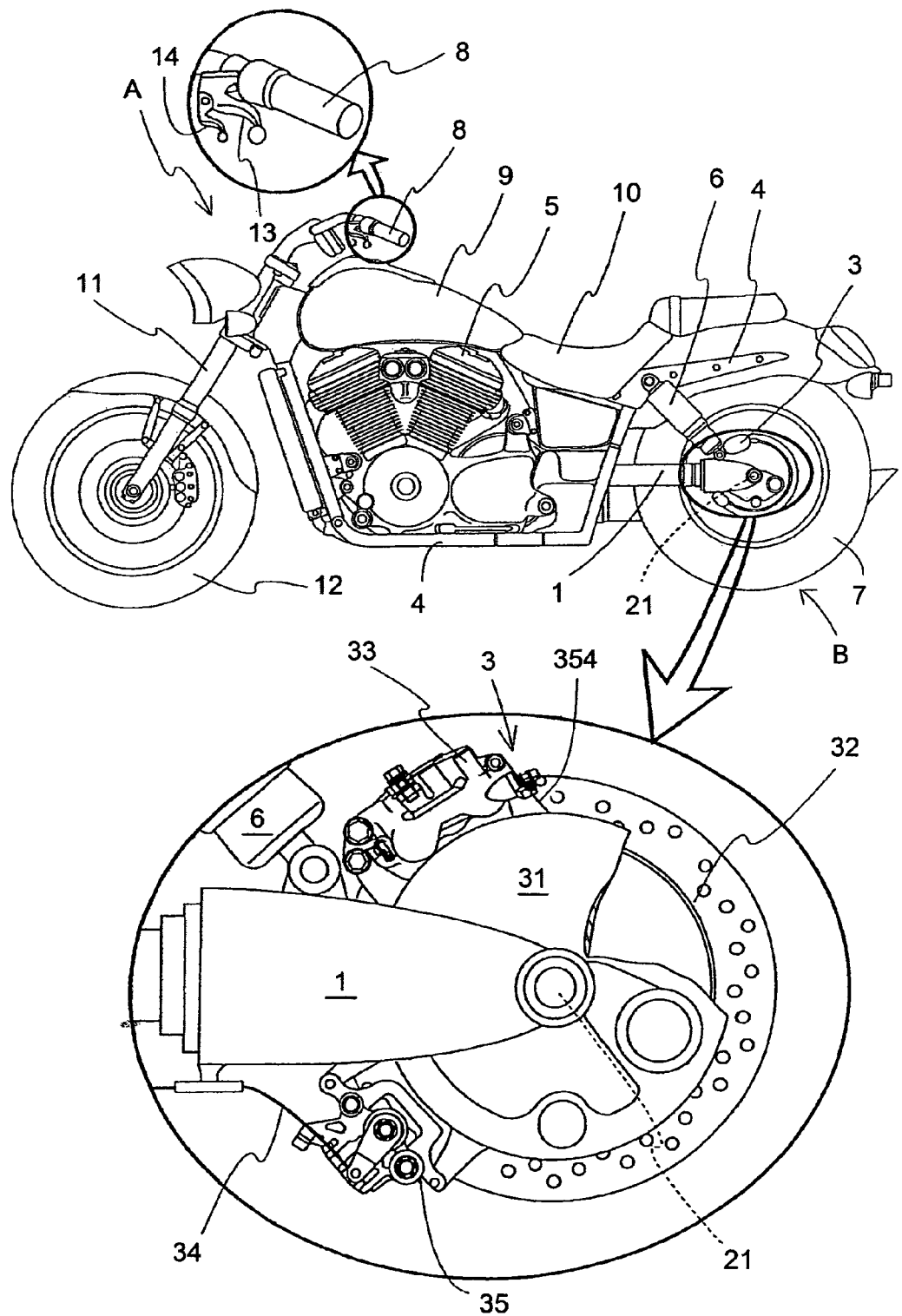
FIG. 1 is a side view showing a state in which a brake device according to the present invention is assembled to a motorcycle.

The brake device for carrying out the invention is illustrated in a state in which the brake device is assembled to a motorcycle on which a vertically-mounted V-type engine is vertically mounted. The detailed explanation of the constitution of parts other than the brake device which constitutes an essential part is omitted. In the drawings, the letter A indicates the motorcycle and the numeral 3 indicates the brake device.

To explain the constitution of the motorcycle A in which the brake device 3 according to the invention is assembled, the motorcycle A is constituted of a swing arm 1, a rear wheel drive portion 2, the brake device 3, a vehicle body frame 4, a vertically-mounted V-type engine 5, a shock absorber 6, a rear wheel 7, a bar handle 8, a fuel tank 9, a seat 10, a front suspension 11, and a front wheel 12.

The swing arm 1 is constituted as follows. The swing arm 1 is tiltably supported on the vehicle body frame 4 which is formed in a given shape using a rod-like members, while the swing arm 1 is formed in a cylindrical shape in a state that a rotatable shaft (not shown in the drawing) which transmits a rotational output from the vertically-mounted V-type engine 5 is arranged therein. Further, the swing arm 1 supports the rear wheel 7 in a cantilever manner by way of the rear wheel drive portion 2, the brake device 3, the shock absorber 6 and the like as described later.

Figure 2:
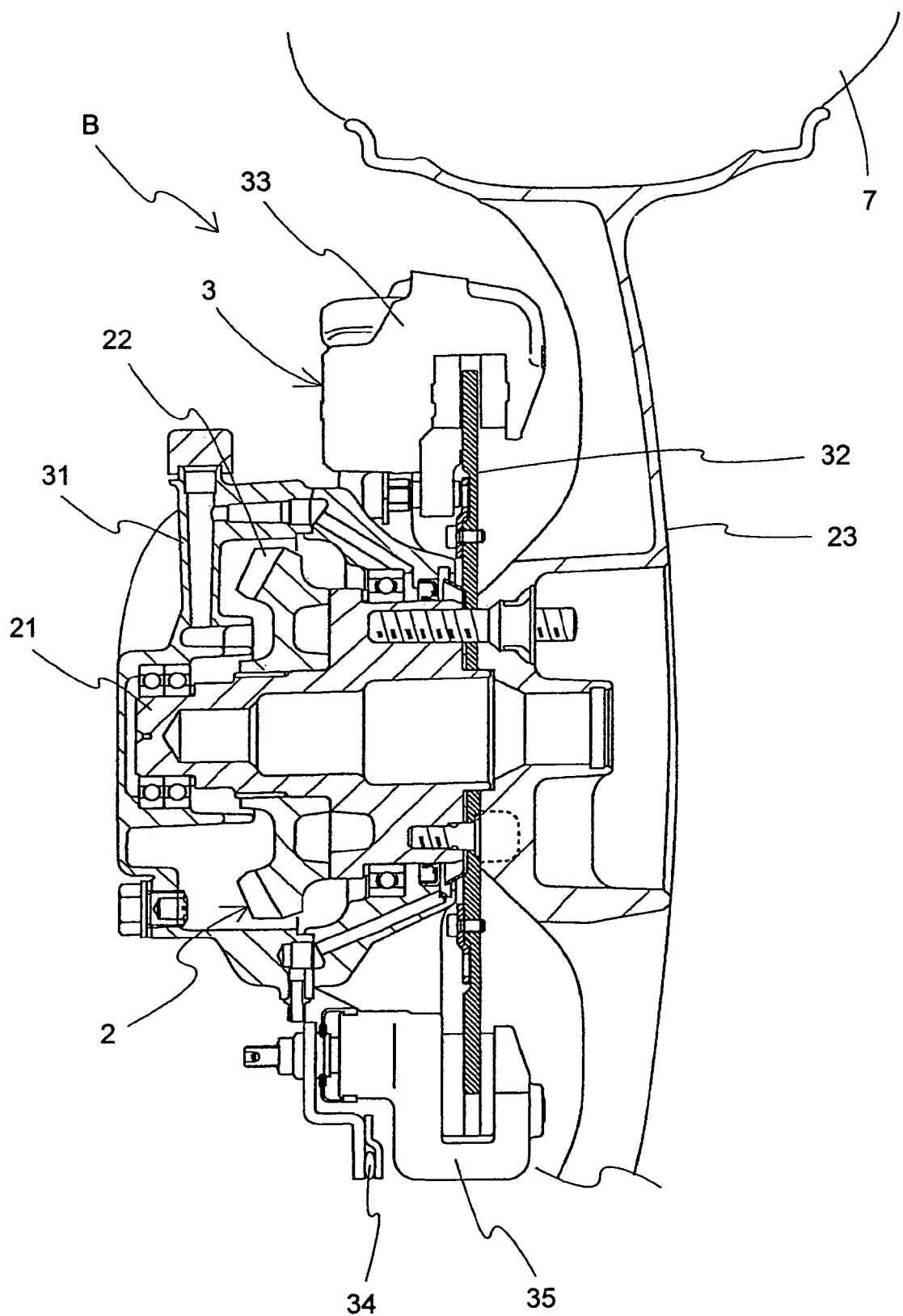
FIG. 2 is an enlarged longitudinal cross-sectional view of an essential part of the brake device.

The rear wheel drive portion 2 includes, as shown in FIG. 2, a worm gear (not shown in the drawing) which is mounted on a distal portion of the propeller shaft, a vehicle axle 21 a worm wheel 22 which is meshed with the worm gear and, at the same time, is meshed with the axle 21, and a tire wheel 23 which is threadedly mounted on the axle 21 along with the brake disc 32 which is also threadedly mounted on an end surface of the axle 21.

The shock absorber 6 is pivotally mounted on the vehicle body frame and is also mounted on a distal end portion of the swing arm 1 Brake disc 32 is threadedly mounted on the axle 21 and is clamped between an end surface of the axle 21 and the tire wheel 23. Brake device 3 includes a gear case cover 31. A hydraulic brake caliper 33 for braking is supported on the gear case cover 31 and clamps the brake disc 32 hydraulically. A mechanical brake caliper 35 for parking is supported on the gear case cover 31 and clamps the brake disc 32 by a pulling operation of a cable 34.

Figure 3:
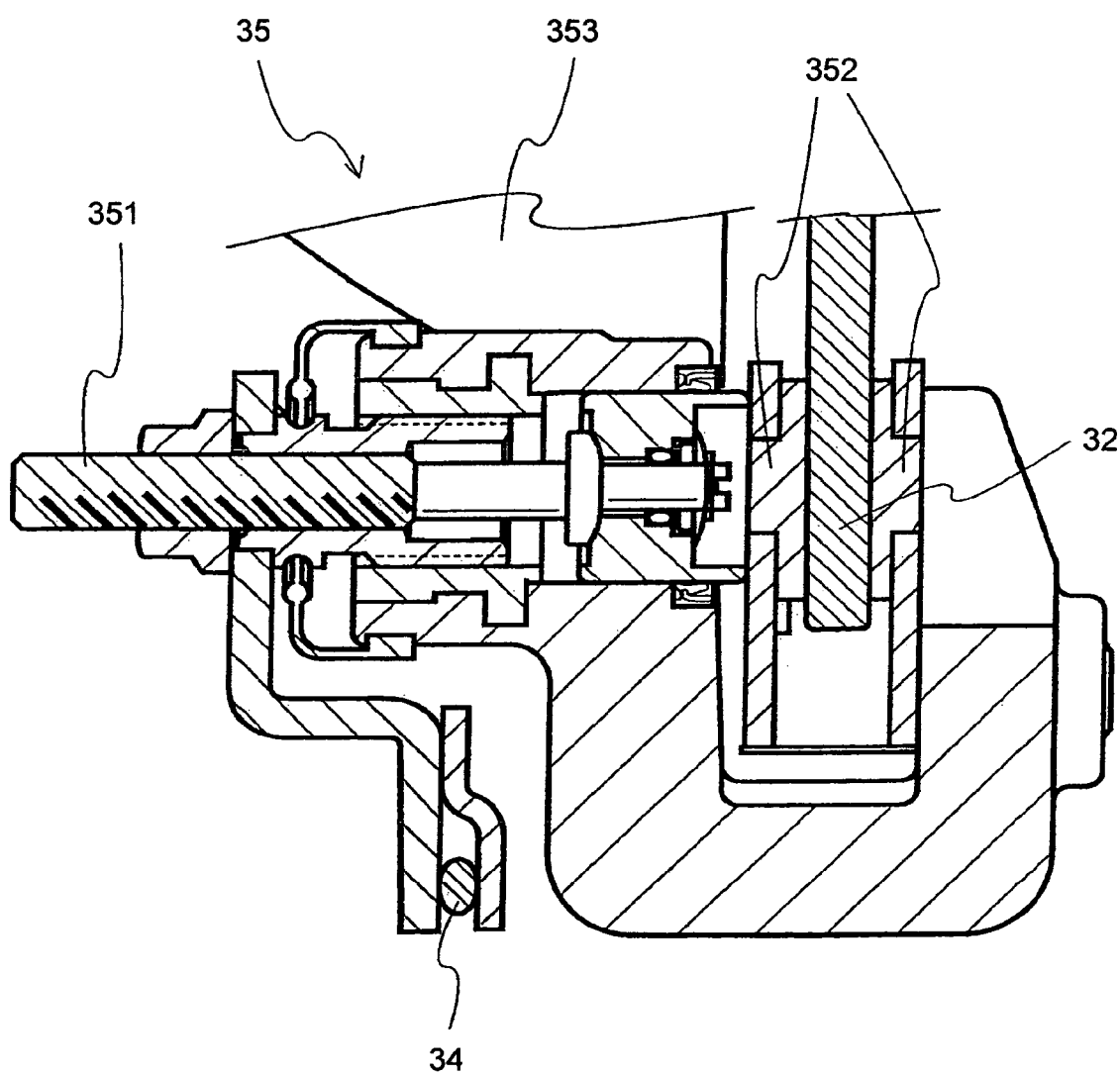
FIG. 3 is an enlarged longitudinal cross-sectional view of a brake caliper for parking.

The mechanical brake caliper 35 for parking has, as shown in FIG. 3, structure in which a shaft 351 is rotated due to the pulling operation of the cable 34, causing a distance between brake pads 352 which are interlocked with the shaft 351 to narrow so as to clamp the brake disc 32 thus performing the braking. As shown in FIG. 1, the brake caliper 35 for parking is threadedly mounted (for example, threaded member and nut) on a mounting bracket 353 which is integrally formed on the gear case cover 31 at a desired position below the swing arm 1 and in front of the axle 21.

Here, by adopting the mechanical brake caliper 35 for parking, it is possible to maintain stable parking brake performance for a long time. Further, the number of parts of the brake device can be decreased thus leading to the reduction of a cost compared to a case in which a hydraulic brake is adopted as the brake caliper 35 for parking.

The brake caliper 33 for braking is, as shown in FIG. 1, threadedly mounted (for example, threaded member and nut) on a mounting bracket 354 which is integrally mounted on the gear case cover 31 arranged at a given position above the swing arm 1 and in front of the axle 21.

The above-mentioned brake caliper 35 for parking is miniaturized compared to the brake caliper 33 for braking.

Accordingly, the brake caliper 35 for parking is arranged below the swing arm 1 and in front of the axle 21, and at the same time, is arranged in a state that distances between the tilting center axis of the swing arm 1 and the respective brake calipers are made as short as possible.

The brake caliper 33 for braking and the brake caliper 35 for parking are arranged as described above and hence, the moment of inertia around the rear wheel is decreased and the followability of the swing arm 1 in response to the fluctuation of the road surface can be enhanced. Further, since the brake hose, the cable 34 and the like can be made short compared to the conventional brake device, it is possible to reduce the weight of the vehicle body and, at the same time, it is possible to suppress the manufacturing cost of the brake device.

Further, since the swing arm 1 functions as a protector against rain, dirt hardly adheres to the brake caliper 35 for parking and, at the same time, since the brake caliper 33 for braking which frequently requires maintenance thereof is arranged above the swing arm 1, the maintenance property is enhanced favorably.

As described above, the brake device 3 which is assembled in the motorcycle A brakes and locks the rear wheel 7 as follows. By allowing a rider to step on a rear brake pedal (not shown in the drawing) which is arranged in front of a right foot rest (not shown in the drawing), the brake caliper 33 for braking clamps the brake disc 32 thus braking the rear wheel 7. Further, by allowing the rider to pull a parking brake lever 14 (parking brake lever 14 being configured to fix or release a state when the cable 34 is pulled) which is arranged in the vicinity of a clutch lever 13 on the bar handle 8 side, the brake caliper 35 for parking clamps the brake disc 32 thus locking the rear wheel 7. Here, the mounting position of the parking brake lever 14 is not particularly limited and may be provided at an arbitrary position of the vehicle body.

Although the brake device for carrying out the present invention has been explained heretofore and is an example of a preferred embodiment for carrying out the present invention, the present invention is not limited to such embodiment and various modifications can be made without departing from the present invention.

For example, the present invention may be applied to a case in which the hydraulic brake caliper is adopted as the brake caliper for parking. Further, the brake caliper for parking may be constituted using the same constitution as the brake caliper for braking.

What is claimed is:

1. A brake device for a motorcycle with a swing arm and an axle, comprising:
    a worm wheel that meshes with the axle;
    the worm wheel for meshing with a worm gear of a propeller shaft that transmits a rotational output outputted from an engine of the motorcycle;
    a brake caliper for braking;
    a brake caliper for parking;
    a gear case cover that covers the worm wheel;
    said brake caliper for braking supported on said gear case cover; and
    said brake caliper for parking supported on said gear case cover;
    wherein the brake caliper for braking and the brake caliper for parking are arranged separately above and below the swing arm of the motorcycle;
    wherein the brake caliper for braking and the brake caliper for parking are arranged separately entirely above and entirely below the axle; and
    further wherein, both the brake caliper for braking and the brake caliper for parking are arranged in front of the axle and not behind the axle.

2. The brake device according to claim 1, wherein the brake caliper for parking is a mechanical brake caliper.

3. The brake device according to claim 1, wherein the brake caliper for parking is arranged below the swing arm of the motorcycle.

4. The brake device according to claim 3, wherein the brake caliper for parking is miniaturized compared to the brake caliper for braking.

5. A brake device for a motorcycle with a swing arm and an axle, comprising:
    a worm wheel that meshes with the axle;
    the worm wheel for meshing with a worm gear of a propeller shaft that transmits a rotational output outputted from an engine of the motorcycle;
    a brake caliper for braking;
    a brake caliper for parking;
    a gear case cover that covers the worm wheel; and
    first and second mounting brackets integrally formed on said gear case cover, said first and second mounting brackets being forward of said axle, said first mounting bracket being above said swing arm and said second bracket being below said swing arm, said brake caliper for braking being mounted on said first mounting bracket and said brake caliper for parking being mounted on said second bracket;
    wherein the brake caliper for braking and the brake caliper for parking are arranged separately above and below the swing arm of the motorcycle; and
    further wherein, both the brake caliper for braking and the brake caliper for parking are arranged in front of the axle and not behind the axle.

6. The brake device according to claim 5, including said motorcycle.

* * * * *